(12) United States Patent
Davis et al.

(10) Patent No.: US 7,475,381 B2
(45) Date of Patent: Jan. 6, 2009

(54) SHALLOW TRENCH AVOIDANCE IN INTEGRATED CIRCUITS

(75) Inventors: Jeffrey B. Davis, El Dorado Hills, CA (US); Rajashri Doddamani, Folsom, CA (US); Byungha Joo, San Jose, CA (US); Duc G. Nguyen, El Dorado Hills, CA (US); Darshana Surti, Roseville, CA (US); Eva Yim, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 11/394,621

(22) Filed: Mar. 30, 2006

(65) Prior Publication Data

US 2007/0240082 A1     Oct. 11, 2007

(51) Int. Cl.
*G06F 17/50* (2006.01)
(52) U.S. Cl. .................................. 716/19; 716/1; 716/2
(58) Field of Classification Search ..................... 716/1, 716/2, 18
See application file for complete search history.

(56) References Cited

U.S. PATENT DOCUMENTS

2008/0173975 A1* 7/2008 Chen et al. .................. 257/529

* cited by examiner

*Primary Examiner*—Thuan Do
(74) *Attorney, Agent, or Firm*—Dana B. Lemoine; Lemoine Patent Services, PLLC

(57) ABSTRACT

Diffusion regions in a standard cell design are bridged across cell boundaries. Shallow trench isolation is reduced and nitride passivation thickness variation is reduced.

18 Claims, 9 Drawing Sheets

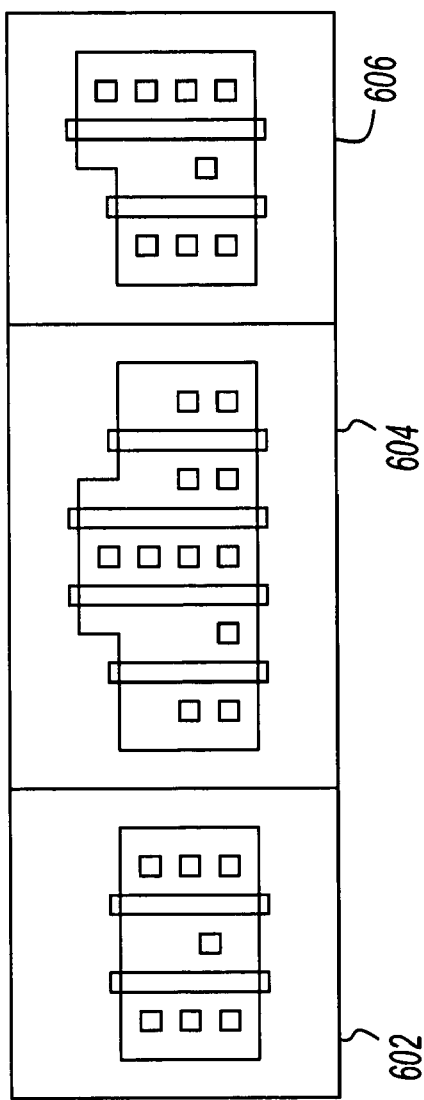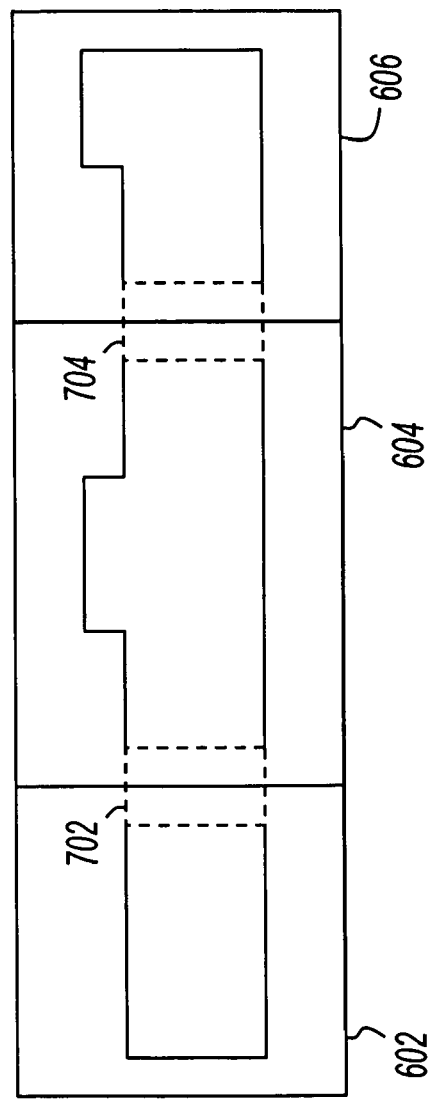

SHALLOW TRENCH AVOIDANCE IN INTEGRATED CIRCUITS

FIELD

The present invention relates generally to integrated circuits, and more specifically to planarization of layers within integrated circuits.

BACKGROUND

Integrated circuits such as processors, memory controllers, and memory devices are typically manufactured by processing many layers on a substrate. The layers may undergo many operations such as deposition, doping, etching, polishing, and the like, during manufacture. As each layer is deposited, attempts are typically made to provide uniformity in thickness and height, or "planarization," of the layers. As device features scale down in modern process technologies, the allowable tolerances also typically scale down, and uniform planarization of layers becomes increasingly difficult to achieve.

Modern integrated circuits may have dozens of layers that are subject to varying degrees of planarization requirements. Further, different types of layers may have varying types of commonly occurring features that present obstacles to planarization. For example, diffusion layers may include voids that isolate different circuits such as transistors. The voids may be filled with "shallow trenches" subsequently covered by later-deposited layers such as passivation layers. The occurrence of shallow trenches may result in passivation layer thickness variations, making uniform planarization more difficult.

BRIEF DESCRIPTION OF THE DRAWINGS

FIGS. 2, 4, and 6 show standard cells arranged in rows in accordance with various embodiments of the present invention;

FIGS. 3, 5, and 7 show standard cells with bridged diffusion regions in accordance with various embodiments of the present invention;

DESCRIPTION OF EMBODIMENTS

Figure 1:
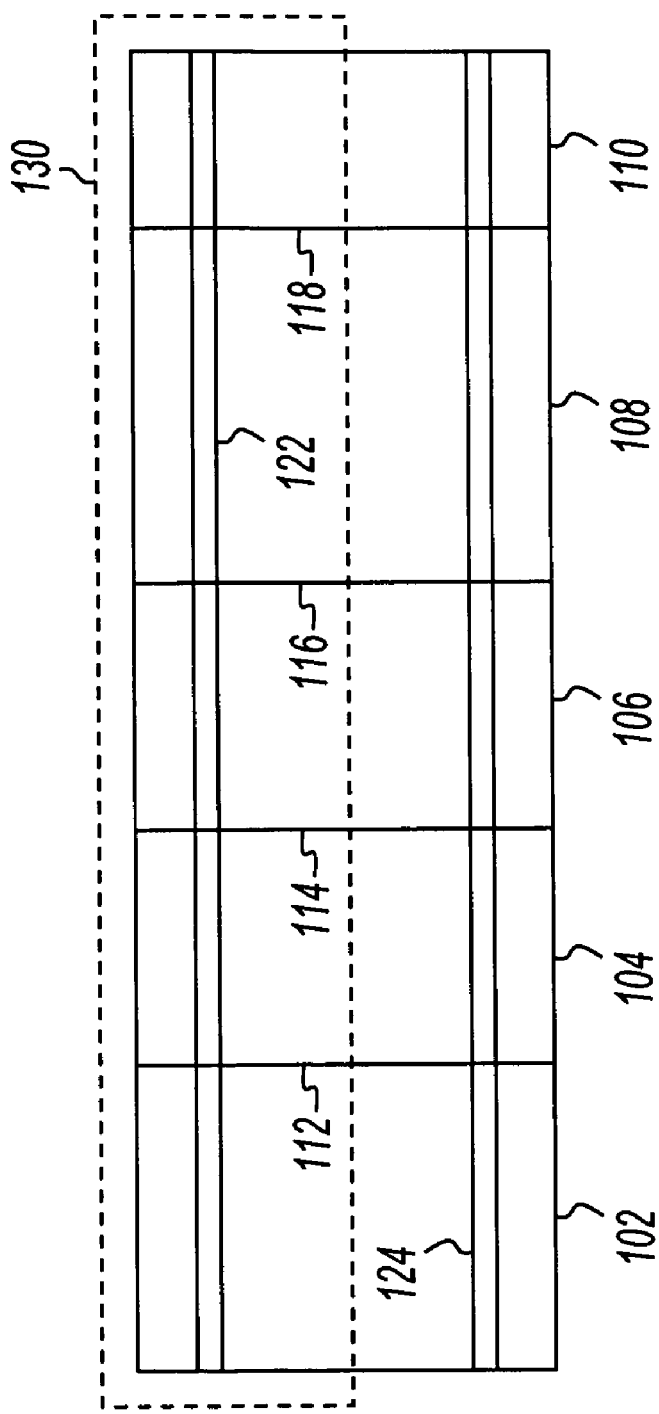
FIG. 1 shows outlines of standard cells arranged in a row.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows outlines of standard cells arranged in a row. Standard cells 102, 104, 106, 108, and 110 are placed with their "east" and "west" boundaries 112, 114, 116, and 118 arranged such that power supply metallizations 122 and 124 and lightly doped N regions (shown collectively at 130) are physically and electrically abutted forming contiguous horizontal polygons. Other than the aforementioned power supply and N regions, the contents of the individual standard cells are considered random in that any one standard cell may be reoriented and placed next to any other standard cell during the design process without violating design rules. In some embodiments, in order to satisfy manufacturing requirements, space is embedded within the cell physical designs to guarantee that any orientation or combination of abutting cells do not violate the electrical or physical proximity rules governing the placement of the random cell content.

Accommodating the design rules as described in the paragraph above results in "white space" between the lateral boundaries of the cells within a row. In various embodiment of the present invention, some of the "white space" may be replaced with physical trenches to isolate individual transistors from one another during certain database preparation operations. Further, in some embodiments of the present invention, the cell boundary may be "bridged" to connect the contents of two adjacent cells when electrically and mechanically feasible. By reducing white space between cells, the frequency of occurrence of shallow trench isolation may be regulated such that the trench density falls within a predetermined manufacturing range.

The frequency of occurrence of shallow trench isolation in the core of integrated circuits may be modified by placing N+/N−, N+/P−, P+/N− and/or P+/P− diffusion polygons where shallow trench isolation would otherwise be placed. The placement of such "unnecessary" diffusions is referred to as shallow trench isolation avoidance. The inclusion of extraneous diffusions is generally contrary to the objectives of the integrated circuit project as it occupies or requires space that has a direct impact on product cost. Various embodiments of the present invention disclose standard cells designed in such a way that adjacent, same-species, same-potential diffusions can be short circuited via diffusion "bridges" to circumvent the placement of shallow trench isolation which in turn reduces the variation of final nitride passivation thickness. Standard cells may be specified in such a way that transistor source regions are of standardized location and size such that adjacent cells will have their sources short-circuited by a standard sized and located diffusion "bridge."

Figure 2:
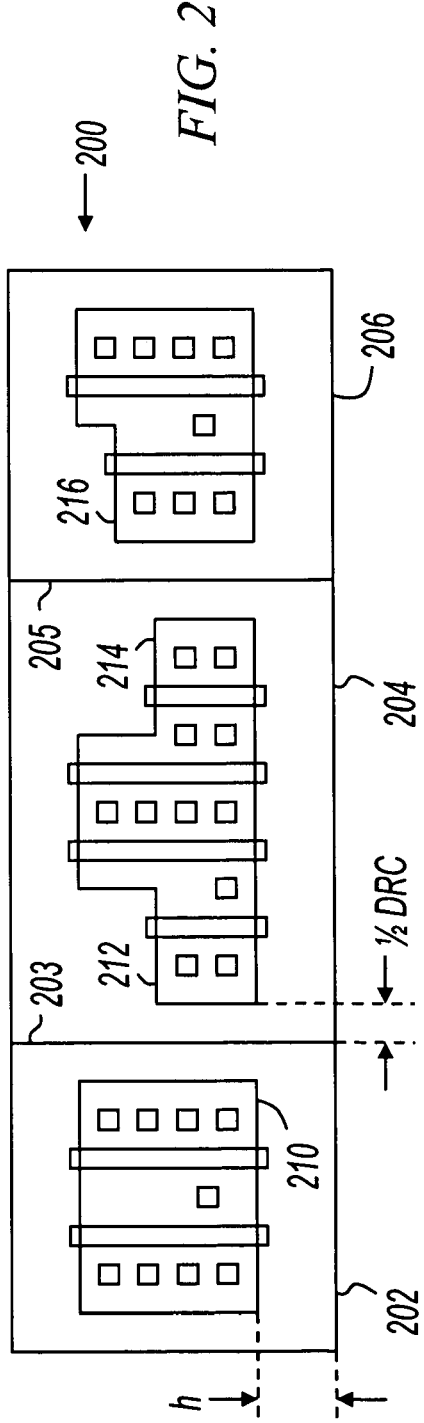

FIG. 2 shows standard cells arranged in a row in accordance with various embodiments of the present invention. Row 200 includes standard cells 202, 204, and 206. Three cells are shown in row 200, however, in a practical design a very large number of cells may be placed in a row. Further, a large number of rows may be placed north to south, creating a large region of standard cells sharing boundaries.

Standard cells 202, 204, and 206 include polygons representing various circuits. Similar polygons within the cells represent physical design features that may be co-located on layers of the integrated circuit. Further, similar polygons may be defined on common "layers" within a design database. As used herein, the term "layer," when used in the context of a physical integrated circuit, refers to a layer of material existing on a substrate. Further, the term "layer," when used in the context of a standard cell library or a design database, refers to a logical layer. Logical layers in a design database may or may not correspond to physical layers in an integrated circuit.

Standard cell 202 includes diffusion region 210 defined near an east-most cell boundary 203. Similarly, standard cell 204 includes diffusion region 212 defined near a west-most cell boundary 203. In addition, standard cell 204 includes diffusion region 214 defined near an east-most cell boundary 205, and standard cell 206 includes diffusion region 216 defined near a west-most cell boundary 205. In various embodiments of the present invention, diffusion regions 210, 212, 214, and 216 are on the same physical layer in the integrated circuit. Further, diffusion regions 210, 212, 214, and 216 may or may not be defined on the same layer in the standard cell library.

Diffusion regions (and other circuit structures) are typically subject to "design rules." Integrated circuit designs typically undergo design rule checks (DRC) prior to manufacture to ensure compliance with the design rules. Many different types of design rules exist. For example, design rules may enforce minimum feature sizes and minimum distances between adjacent structures to ensure electrical isolation. As shown in FIG. 2, west-most diffusion region 212 of cell 204 is defined to be a distance of one half the minimum distance (shown as ½ DRC) between diffusion regions. When cells are placed adjacent in a row, the minimum distance rule is satisfied, resulting in "white space" between adjacent diffusion regions.

The white space created between diffusion regions 210 and 212, if manufactured as shown in FIG. 2, results in a shallow trench to isolate diffusion regions 210 and 212. Further, the white space between diffusion regions 214 and 216 also results in a shallow trench. Various embodiments of the present invention replace shallow trench isolation regions with diffusion polygons. The placement of these diffusion polygons, and the resulting "bridged" diffusions helps avoid shallow trenches. In some embodiments, the standard cells are designed in such a way that adjacent, same-species, same-potential diffusion regions may be short circuited via diffusion bridges to circumvent the placement of shallow trench isolation which in turn reduces the variation of final nitride passivation thickness.

As used herein, the term "same-species" refers to structures made of the same material or treated in such a manner that they may be connected across cell boundaries. For example, two diffusion regions that are N+ material in P-starting material are considered same-species. Also for example, two diffusion regions that are N+ material in P-epitaxy are same-species. Further, two diffusion regions that are P+ material in an N-well may be considered as same-species. Many other types of same-species material may exist, and the foregoing list of examples is not meant be exhaustive.

As used herein, the term "same-potential" refers to structures that are meant to be at the same electrical potential in the finished design. For example, circuit nodes that are to be coupled to circuit ground would be considered same-potential. Also for example, circuit nodes that are to be coupled together in the finished design may be considered as same-potential.

In some embodiments, cells are designed in such a way that diffusion regions located at the east-most and west-most cell boundaries may be bridged across the cell boundaries without adversely affecting the electrical performance of the resulting integrated circuit. For example, diffusion regions 210, 212, 214, and 216 may be transistor source nodes all coupled to the same electrical potential in the circuit. Further, the diffusion regions may be specified as diffusion regions coupled to a power supply node.

In some embodiments, standard cells are designed such that east-most and west-most diffusion regions are all a standard height from a cell origin, shown as "h" in FIG. 2. In these embodiments, when an east-most diffusion region and a west-most diffusion region of adjacent cells are same-species and same-potential, the diffusion regions may be bridged beginning at a height h. Various bridging embodiments at a height h are shown in FIG. 3.

Figure 3:
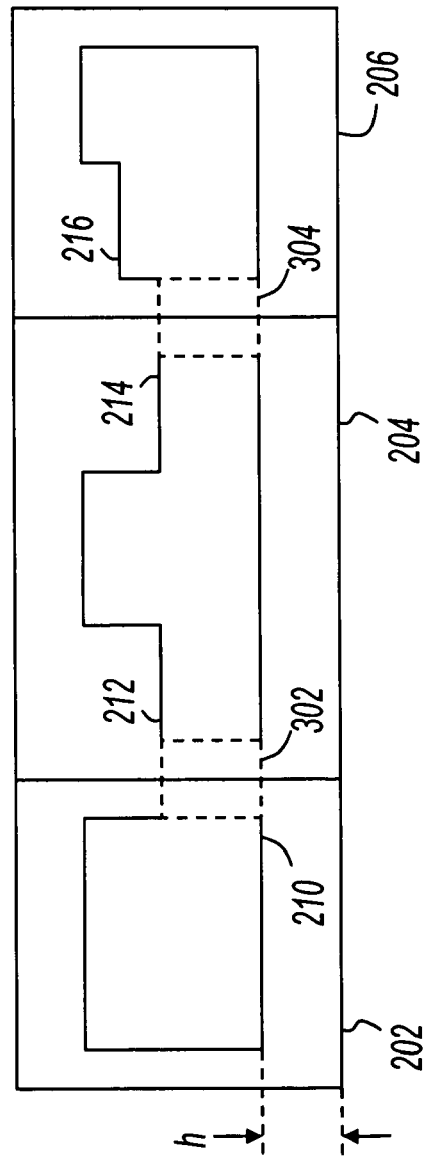

FIG. 3 shows standard cells arranged in a row with bridged diffusion regions. Standard cells 202, 204, and 206 are shown arranged in a row in the same manner as in FIG. 2. Cell 202 includes a diffusion polygon having an east-most diffusion region 210. Standard cell 204 is shown having a west-most diffusion region 212 and an east-most diffusion region 214, and cell 206 is shown having a west-most diffusion region 216. As shown in FIG. 3, diffusion regions 210 and 212 are bridged using diffusion polygon 302. The dashed lines separating diffusion regions 210 and 212 and polygon 302 are shown in FIG. 3 to provide a distinction between diffusion regions existing in standard cells as defined, and an entire diffusion region as drawn after bridging. Similarly, diffusion polygon 304 is shown bridging east-most diffusion region 214 of cell 204 and west-most diffusion region 216 of cell 206.

As diffusion regions are implanted after poly gate terminals are patterned, there is no physical diffusion area under the gate region of transistors. Although the diffusion region in FIG. 3 is drawn as continuous, the physical diffusion regions as implemented in an integrated circuit are interrupted each time they are intersected by a polysilicon polygon.

Diffusion polygons 302 and 304 may be placed at any suitable point in the design process. For example, in some embodiments, each cell in a standard cell library is defined to have all or a portion of polygon 302 defined on a layer other than the layer upon which the source diffusion regions are defined. The term layer as used in this context refers to a logical layer in a design database, and not necessarily to a physical layer in the integrated circuit as implemented. In these embodiments, the bridging polygon may be generated to connect adjacent diffusion regions by logically combining polygons from adjacent standard cells and placing them on the same layer as the east-most and west-most diffusion regions.

In embodiments represented by FIG. 3, each bridging polygon has a bottom edge at a height H from a cell origin, and also has a fixed vertical height. In some embodiments, bridging polygons may be defined having a lower edge at a fixed height from the cell origin, and having a variable height based on the height of the diffusion region in the cell.

In some embodiments, standard cells in a library are defined in such a way so as to provide for bridging of same-species, same-potential transistor source regions. For example, in some embodiments, east-most and west-most transistor sources may be defined such that there non-poly facing edge is extended laterally to the cell boundary. Further, east-most and west-most transistor sources may be defined such their non-poly facing edge is extended laterally beyond the cell boundary. Still further, the layout of east-most transistor sources may be defined such as their non-poly facing edge is extended laterally to the west-most edge of the adjacent same-species, same-potential diffusion. Further, the layout of west-most transistor sources may be defined such that their non-poly facing edge is extended laterally to the east-most edge of the adjacent same-species, same-potential diffusion. Each of the diffusion extension polygons described in this paragraph may be located on a unique data layer within the design database. By location polygons on a unique data layer, they may be provided within a standard cell library while providing east-most and west-most diffusion regions that still satisfy design rule checks.

By bridging diffusion regions across cell boundaries as shown in FIG. 3, the diffusion density in the core of an integrated circuit may be increased by utilizing space between adjacent same-species, same-potential diffusions that is ordinarily unused. Increasing diffusion density reduces shallow trench isolation and has a favorable impact on the final nitride thickness variation.

Figure 4:
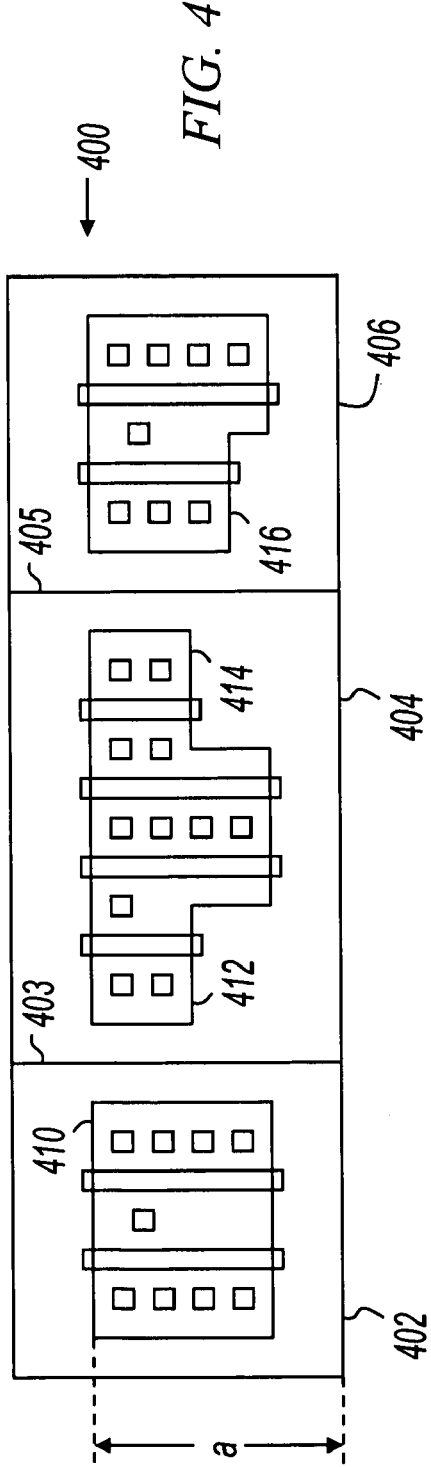
Figure 5:
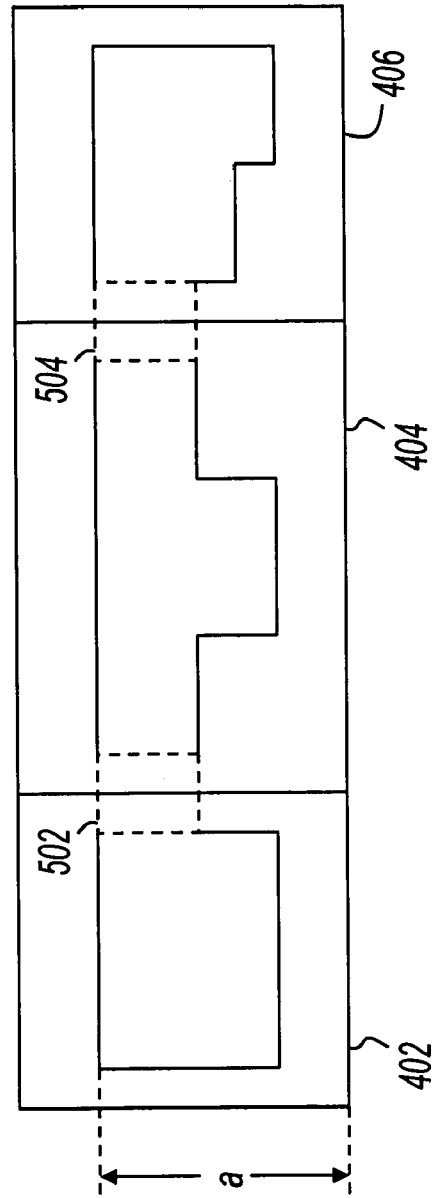

FIG. 4 shows a row of standard cells arranged in row, and FIG. 5 shows the drawn diffusion layer only for the same row of standard cells having bridged diffusion regions. Standard cells 402, 404, and 406 are arranged in a row similar to the standard cells shown in FIG. 2. Cell 402 includes a circuit having an east-most diffusion region 410, cell 404 includes circuits having a west-most diffusion region 412 and an east-most diffusion region 414, and cell 406 includes circuits having a west-most diffusion region 416. Cells 402 and 404 are separated at boundary 403, and cells 404 and 406 are separated at boundary 405.

Similar to the row of cells shown in FIG. 2, row of cells 400 includes east-most and west-most diffusion regions defined such that they may be bridged across cell boundaries to reduce shallow trench isolation. In some embodiments, each of the cells in the standard cell library are defined such that a top edge of east-most and west-most diffusion regions are defined at a common height above a cell origin. This common height is shown as "a" in FIG. 4.

As a result of bridging diffusion regions across cell boundaries, FIG. 5 shows a continuous drawn diffusion region spanning multiple standard cells. For example, cells 402 and 404 have diffusion regions bridged by diffusion polygon 502, and cells 404 and 406 have diffusion regions bridged by diffusion polygon 504. As shown in FIG. 5, diffusion polygons 502 and 504 have a top edge located at a common height a above the cell origin. Further, the vertical dimension of bridging polygons 502 and 504 are constant.

In some embodiments, the vertical height of bridging polygons 502 and 504 are not constant. For example, the height of a bridging polygon may be a function of the height of an east-most or west-most diffusion region located near a cell boundary.

FIG. 6 shows a row of standard cells arranged in row, and FIG. 7 shows the same row of standard cells having bridged diffusion regions. East-most and west-most diffusion regions of the standard cells shown in FIG. 6 are defined having a constant vertical dimension such that bridging polygons may be placed in the same location between adjacent cells. For example, referring now to FIG. 7, bridging polygons 702 and 704 are placed between cells 602 and 604, and 604 and 606, respectively.

Figure 8:
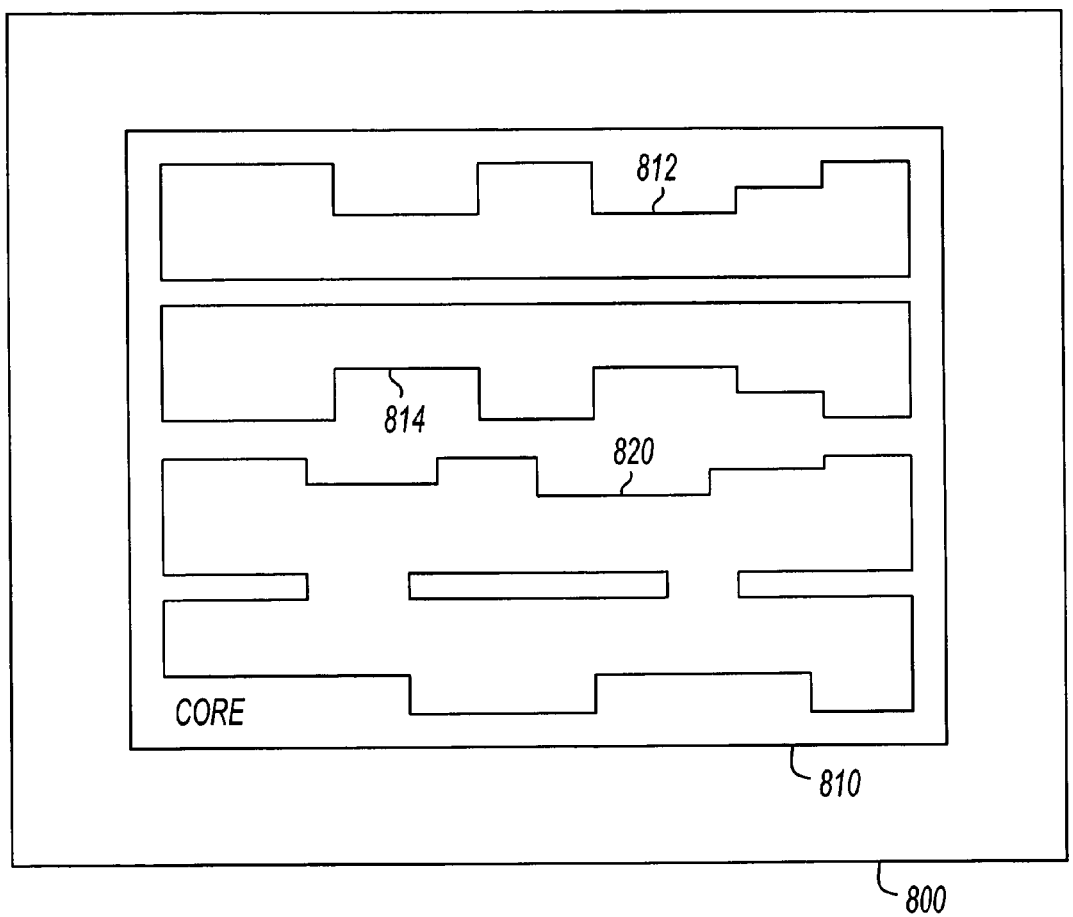
FIG. 8 shows bridged diffusion regions in an integrated circuit core.

FIG. 8 shows an integrated circuit. Integrated circuit 800 includes core 810. Integrated circuit 800 may include many other circuits, such as input/output circuits, power supply circuits, voltage reference circuits, and the like. Core 810 includes drawn diffusion regions 812, 814, and 820. Diffusion region 812 represents a diffusion region that spans multiple standard cells arranged in a row. For example, diffusion region 812 may represent a continuous diffusion region shown in FIG. 3, 5, or 7. Further, diffusion region 814 represents a drawn diffusion region spanning multiple standard cells in a row. Although the drawn diffusion regions shown in FIG. 8 span the entire length of each row in core 810, this is not a limitation of the present invention. For example, any of the diffusion regions may span only two cells in a row or any number of cells in a row. Diffusion region 820 represents a diffusion region spanning multiple cells in multiple rows. For example, same-species, same-potential diffusion regions existing in adjacent cells in separate rows may be bridged using bridging polygons as described with reference to the previous figures. As a result, diffusion regions may be bridged to span cells in a given row, and diffusion regions may also be bridged to span cells in different rows.

Figure 9:
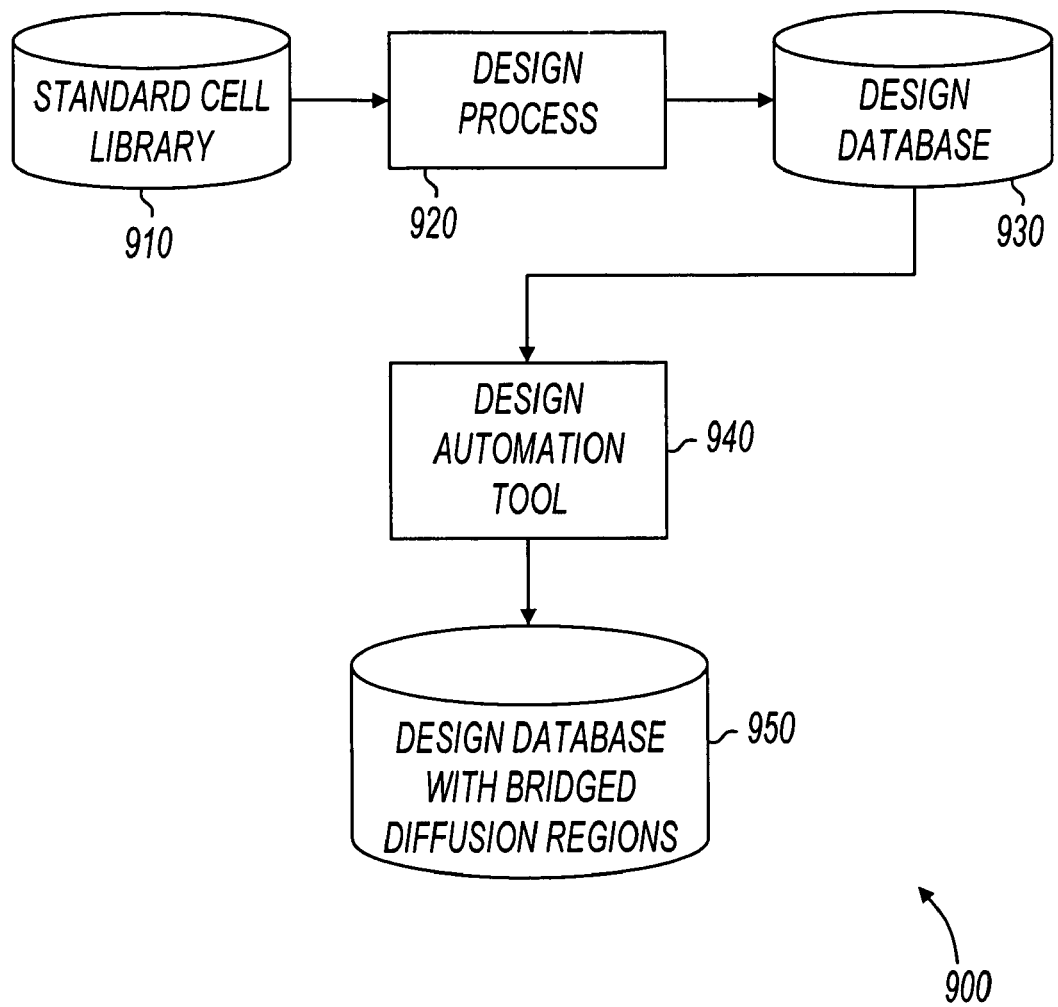
FIG. 9 shows an integrated circuit design flow.

FIG. 9 shows an integrated circuit design flow. Design flow 900 shows standard cell library 910, design process 920, design database 930, design automation tool 940, and design database with bridged diffusion regions 950.

Standard cell library 910 may be a standard cell library having cells defined such that east-most and west-most diffusion regions satisfy specific constraints which provide for bridging diffusion regions across cell boundaries. For example, diffusion regions may be defined to include transistor sources near cell boundaries. Further, diffusion regions near cell boundaries may be defined as transistor sources coupled to a power supply node. Further, the physical dimensions of east-most and west-most diffusion regions may be constrained. For example, bottom edges and/or top edges may be constrained in physical placement relative to a cell origin. In addition, bridging polygons may be specified within cells. For example, bridging polygons may be defined on separate data layers, and these bridging polygons may extend to cell boundaries or beyond cell boundaries.

Standard cell library 910 may be embodied on a physical medium, such as a hard disk drive, a compact disc, or other memory device. Further, standard cell library 910 may exist in a network based repository, accessible from computers coupled to the network. In some embodiments, standard cell library 910 may be accessed across a network either wired or wirelessly.

Design process 920 represents the process of instantiating cells from standard cell library 910 to arrive at a design for an integrated circuit. In some embodiments, design process 920 involves a user placing standard cells in rows using a graphical user interface on a workstation. Further, design process 920 may involve synthesizing circuits using hardware design languages (HDL). The manner in which design process 920 instantiates cells from standard cell library 910 is not a limitation to the present invention.

Design database 930 represents an integrated circuit design that includes rows of standard cell instantiations. For example, the rows shown in FIGS. 2, 4, and 6 may exist in design database 930. In addition, layers others than those shown in FIGS. 2, 4, and 6 may be included in design database 930.

Design automation tool 940 reads design database 930, and conditionally performs bridging of diffusion regions between adjacent standard cell instantiations resulting in reduced shallow trench isolation. Operations of design automation tool 940 are described below with reference to FIG. 10. Design automation tool 940 may be a software tool that runs on a suitable computing device. For example, design automation tool 940 may be a set of instructions held on a machine-readable medium such as a disk drive or solid state memory device. In this example, design automation tool 940 may perform as described when the instructions are accessed are by the suitable computing device.

Design database with bridged diffusion regions 950 corresponds to a design database for an integrated circuit that includes diffusion regions that span multiple standard cell instantiations. For example, core 810 (FIG. 8) may be included within design database 950.

Figure 10:
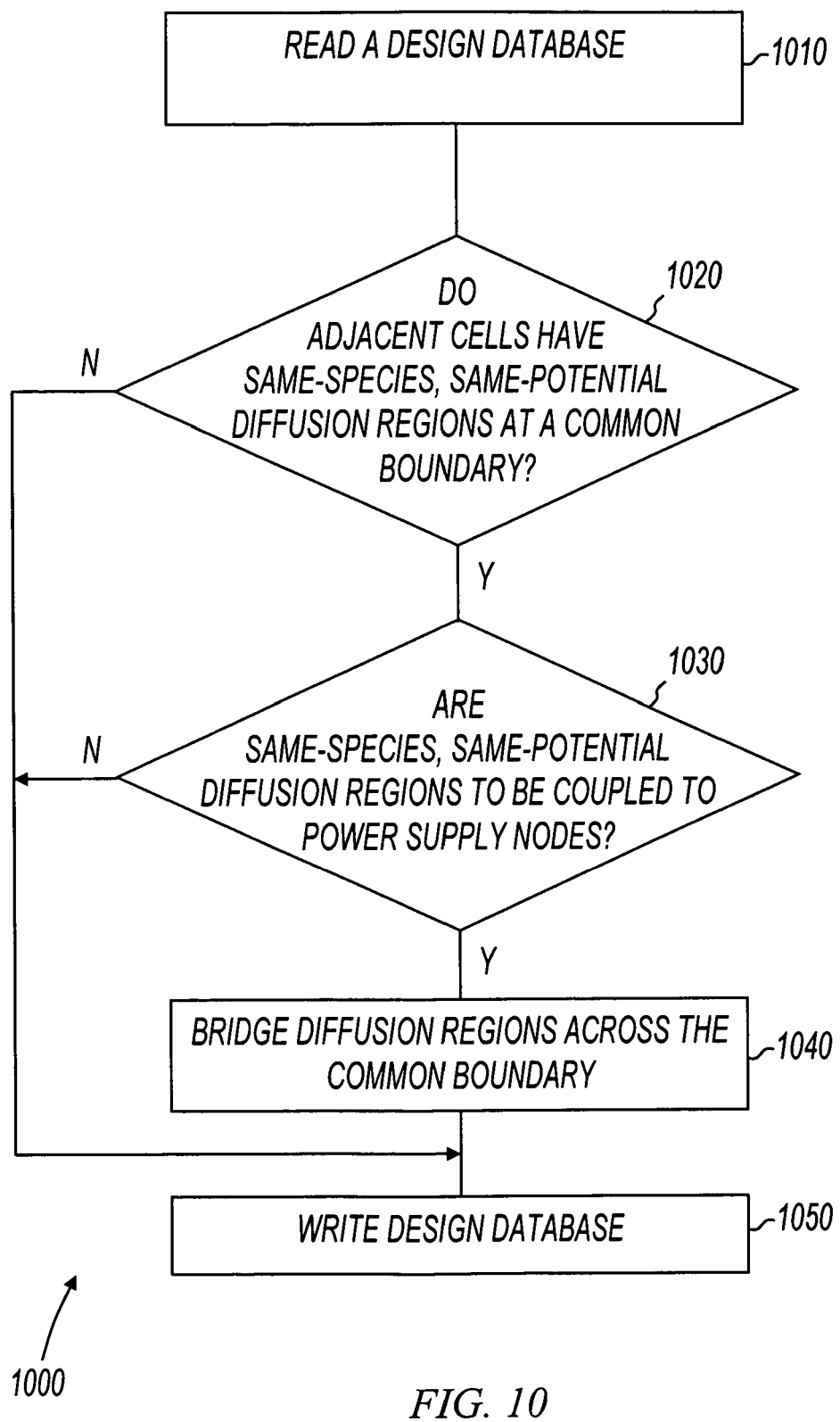
FIG. 10 shows a flowchart in accordance with various embodiments of the present invention.

FIG. 10 shows a flowchart in accordance with various embodiments of the present invention. In some embodiments, method 1000 may be used to bridge diffusion regions to reduce shallow trench isolation. In some embodiments, method 1000, or portions thereof, is performed by an integrated circuit design automation tool, embodiments of which are shown in the various figures. The various actions in method 1000 may be performed in the order presented, or may be performed in a different order. Further, in some embodiments, some actions listed in FIG. 10 are omitted from method 1000.

Method 1000 begins at 1010 in which a design database is read. In some embodiments, the actions of 1010 correspond to design automation tool 940 reading design database 930 (FIG. 9). At 1020, the design automation tool determines if adjacent cells have same-species, same-potential diffusion regions at a common boundary. If not, method 1000 continues at 1050 where a design database is written. In these embodiments, the design database written will not have bridged diffusion regions. If, however, at 1020, adjacent cells have same-species, same-potential diffusion regions, method 1000 continues at 1030 where the design automation tool determines if the same-species, same-potential diffusion regions are to be coupled to power supply nodes. If they are to be coupled to power supply nodes, then the diffusion regions are bridged across the common boundary at 1040. If the diffusion regions are not to be coupled to power supply nodes, then the design database is written at 1050 without bridged diffusion regions.

In some embodiments, the actions at 1030 are omitted and diffusion regions are bridged regardless of whether the same-species, same-potential diffusion regions are to be coupled to power supply nodes.

Diffusion regions may be bridged in many different ways. For example, the standard cell library in which the cells are defined may include polygons suitable to bridge diffusion regions, where the polygons are located on layers other than the diffusion layer so as to not violate design rules. After moving polygons from the "hidden" data layer to the diffusion layer, they may be logically combined using suitable logical operations such as OR operations, AND operations, and exclusive OR operations. Further, in some embodiments, the design automation tool may generate new polygons in order to bridge diffusion regions. Still further, the design automation tool may stretch existing diffusion polygons across cell boundaries to bridge diffusion regions at 1040. Diffusion regions may be bridged across any cell boundary, including east, west, north, and south boundaries.

Figure 11:
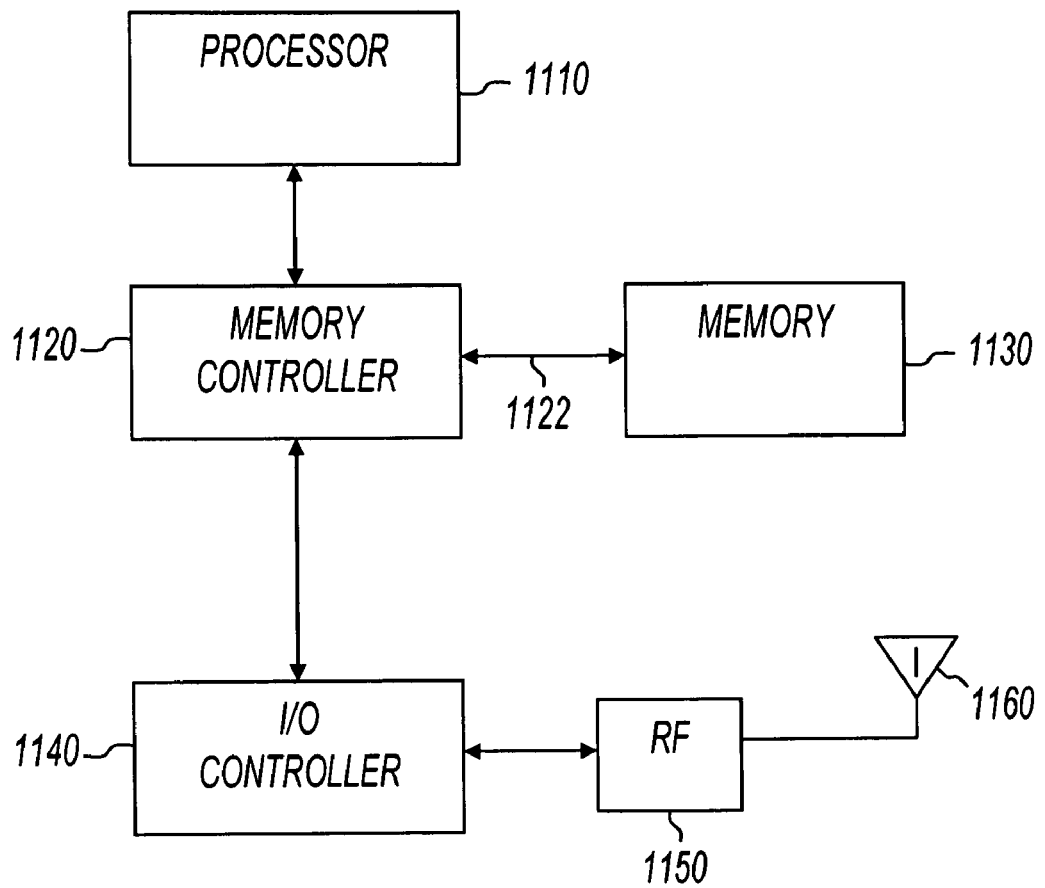
FIGS. 11 and 12 show diagrams of electronic systems in accordance with various embodiments of the present invention.

FIG. 11 shows an electronic system in accordance with various embodiments of the present invention. Electronic system 1100 includes processor 1110, memory controller 1120, memory 1130, input/output (I/O) controller 1140, radio frequency (RF) circuits 1150, and antenna 1160. In operation, system 1100 sends and receives signals using antenna 1160, and these signals are processed by the various elements shown in FIG. 11. Antenna 1160 may be a directional antenna or an omni-directional antenna. As used herein, the term omni-directional antenna refers to any antenna having a substantially uniform pattern in at least one plane. For example, in some embodiments, antenna 1160 may be an omni-directional antenna such as a dipole antenna, or a quarter wave antenna. Also for example, in some embodiments, antenna 1160 may be a directional antenna such as a parabolic dish antenna, a patch antenna, or a Yagi antenna. In some embodiments, antenna 1160 may include multiple physical antennas.

Radio frequency circuit 1150 communicates with antenna 1160 and I/O controller 1140. In some embodiments, RF circuit 1150 includes a physical interface (PHY) corresponding to a communications protocol. For example, RF circuit 1150 may include modulators, demodulators, mixers, frequency synthesizers, low noise amplifiers, power amplifiers, and the like. In some embodiments, RF circuit 1150 may include a heterodyne receiver, and in other embodiments, RF circuit 1150 may include a direct conversion receiver. In some embodiments, RF circuit 1150 may include multiple receivers. For example, in embodiments with multiple antennas 1160, each antenna may be coupled to a corresponding receiver. In operation, RF circuit 1150 receives communications signals from antenna 1160, and provides analog or digital signals to I/O controller 1140. Further, I/O controller 1140 may provide signals to RF circuit 1150, which operates on the signals and then transmits them to antenna 1160.

Processor 1110 may be any type of processing device. For example, processor 1110 may be a microprocessor, a microcontroller, or the like. Further, processor 1110 may include any number of processing cores, or may include any number of separate processors.

Memory controller 1120 provides a communications path between processor 1110 and other devices shown in FIG. 11. In some embodiments, memory controller 1120 is part of a hub device that provides other functions as well. As shown in FIG. 11, memory controller 1120 is coupled to processor 1110, I/O controller 1140, and memory 1130.

Memory 1130 may be any type of memory technology. For example, memory 1130 may be random access memory (RAM), dynamic random access memory (DRAM), static random access memory (SRAM), nonvolatile memory such as FLASH memory, or any other type of memory.

Memory 1130 may represent a single memory device or a number of memory devices on one or more memory modules. Memory controller 1120 provides data through bus 1122 to memory 1130 and receives data from memory 1130 in response to read requests. Commands and/or addresses may be provided to memory 1130 through conductors other than bus 1122 or through bus 1122. Memory controller 1130 may receive data to be stored in memory 1130 from processor 1110 or from another source. Memory controller 1120 may provide the data it receives from memory 1130 to processor 1110 or to another destination. Bus 1122 may be a bi-directional bus or unidirectional bus. Bus 1122 may include many parallel conductors. The signals may be differential or single ended.

Memory controller 1120 is also coupled to I/O controller 1140, and provides a communications path between processor 1110 and I/O controller 1140. I/O controller 1140 includes circuitry for communicating with I/O circuits such as serial ports, parallel ports, universal serial bus (USB) ports, and the like. As shown in FIG. 11, I/O controller 1140 provides a communications path to RF circuits 1150.

In various embodiments of the present invention, one or more of the integrated circuits in system 1100 include standard cell designs having bridged diffusion regions. For example, memory controller 1120 may be an integrated circuit having a core with bridged diffusion regions and reduced shallow trench isolation. Any of the embodiments described herein may be utilized with any of the circuits of system 1100.

Figure 12:
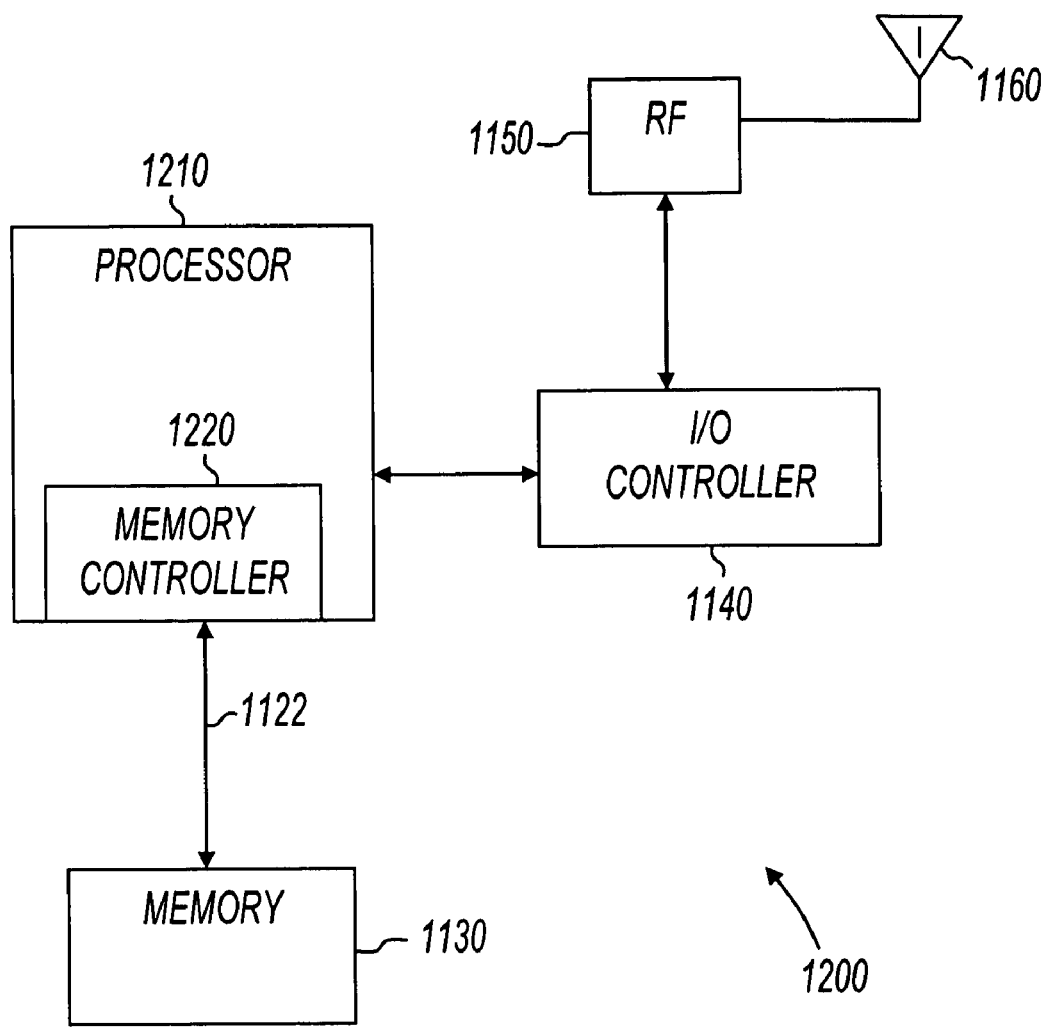

FIG. 12 shows an electronic system in accordance with various embodiments of the present invention. Electronic system 1200 includes memory 1130, I/O controller 1140, RF circuits 1150, and antenna 1160, all of which are described above with reference to FIG. 11. Electronic system 1200 also includes processor 1210 and memory controller 1220. As shown in FIG. 12, memory controller 1220 is included in processor 1210. Processor 1210 may be any type of processor as described above with reference to processor 1110 (FIG. 11). Processor 1210 differs from processor 1110 in that processor 1210 includes memory controller 1220, whereas processor 1110 does not include a memory controller.

Example systems represented by FIGS. 11 and 12 include desktop computers, laptop computers, cellular phones, personal digital assistants, wireless local area network interfaces, or any other suitable system. Many other systems uses for integrated circuits with bridged diffusion regions exist. For example, the various embodiments described herein may be used in a server computer, a network bridge or router, or any other system with or without an antenna.

Further, systems represented by FIGS. 11 and 12 may be systems capable of performing a standard cell design. For example, instructions for the various method embodiments of the present invention may be stored in memory 1130, and processor 1110 or processor 1210 may perform the operations associated with the methods.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A computer-readable medium having stored thereon a library of cells for use in an integrated circuit design automation tool, the library of cells including a plurality of cell definitions having diffusion regions defined near cell boundaries, wherein the diffusion regions are same-species and same-potential regions having bottom edges defined at a common height relative to cell origins, such that when operated on by the integrated circuit design automation tool, the diffusion regions can be combined across the cell boundaries.

2. The computer-readable medium of claim 1 wherein the diffusion regions represent transistor source nodes.

3. The computer-readable medium of claim 2 wherein the transistor source nodes are to be coupled to a power supply node.

4. The computer-readable medium of claim 1 wherein the diffusion regions have top edges defined at a common height relative to cell origins.

5. The computer-readable medium of claim 1 wherein the diffusion regions have common vertical dimensions defined.

6. A method of bridging diffusion regions in an integrated circuit design comprising:
    reading a design database that includes instantiations of standard cells that form the integrated circuit design;
    determining adjacent ones of the instantiations having same-species, same-potential diffusion regions with bottom edges defined at a common height relative to cell origins at a common boundary; and
    if the same-species, same-potential diffusion regions exist, bridging them to form a continuous diffusion region across the common boundary.

7. The method of claim 6 wherein the adjacent ones of the instantiations are adjacent in a row.

8. The method of claim 6 wherein the adjacent ones of the instantiations are adjacent in separate rows.

9. The method of claim 6 further comprising:
    determining if the same-species, same-potential diffusion regions are to be electrically coupled to a power supply node; and
    only bridging the same-species, same-potential diffusion regions if they are to be electrically coupled to a power supply node.

10. A computer-readable medium having stored thereon a library of cells for use in an integrated circuit design automation tool, the library of cells including a plurality of cell definitions having diffusion regions defined near cell boundaries, wherein the diffusion regions are same-species and same-potential regions having top edges defined at a common height relative to cell origins, such that when operated on by the integrated circuit design automation tool, the diffusion regions can be combined across the cell boundaries.

11. The computer-readable medium of claim 10 wherein the diffusion regions represent transistor source nodes.

12. The computer-readable medium of claim 11 wherein the transistor source nodes are to be coupled to a power supply node.

13. The computer-readable medium of claim 10 wherein the diffusion regions have bottom edges defined at a common height relative to cell origins.

14. The computer-readable medium of claim 10 wherein the diffusion regions have common vertical dimensions defined.

15. A method of bridging diffusion regions in an integrated circuit design comprising:
    reading a design database that includes instantiations of standard cells that form the integrated circuit design;
    determining adjacent ones of the instantiations having same-species, same-potential diffusion regions with top edges defined at a common height relative to cell origins at a common boundary; and
    if the same-species, same-potential diffusion regions exist, bridging them to form a continuous diffusion region across the common boundary.

16. The method of claim 15 wherein the adjacent ones of the instantiations are adjacent in a row.

17. The method of claim 15 wherein the adjacent ones of the instantiations are adjacent in separate rows.

18. The method of claim 15 further comprising:
    determining if the same-species, same-potential diffusion regions are to be electrically coupled to a power supply node; and
    only bridging the same-species, same-potential diffusion regions if they are to be electrically coupled to a power supply node.

* * * * *